(12) United States Patent
Chen et al.

(10) Patent No.: US 6,644,330 B1
(45) Date of Patent: Nov. 11, 2003

(54) UNIDIRECTIONAL RETROACTION ELECTROMAGNETIC VALVE

(75) Inventors: Shiang-Fu Chen, Hsinchu Hsien (TW); Chien-An Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/141,939

(22) Filed: May 10, 2002

(51) Int. Cl.[7] ............................................. F16K 31/05
(52) U.S. Cl. ...................................... 137/1; 137/614.21
(58) Field of Search ............................... 137/614.21, 1, 137/613

(56) References Cited

U.S. PATENT DOCUMENTS

| | | | | |
|---|---|---|---|---|
| 3,667,495 A | * | 6/1972 | Schuler et al. | 137/101.21 |
| 4,081,235 A | * | 3/1978 | Van Der Veer | 137/66 X |
| 4,475,513 A | * | 10/1984 | Flaig et al. | 137/614.21 X |
| 5,408,457 A | | 4/1995 | Fujino et al. | |

FOREIGN PATENT DOCUMENTS

| | | |
|---|---|---|
| TW | 271857 | 2/1993 |
| TW | 424857 | 10/1999 |

* cited by examiner

*Primary Examiner*—Kevin Lee
(74) *Attorney, Agent, or Firm*—Birch, Stewart, Kolasch & Birch, LLP

(57) ABSTRACT

A unidirectional-retroaction electromagnetic valve comprises a valve body, O-ring, manual opening unit, and electrically controlled blocking unit. The valve body is connected to a gas source directly and the electrically controlled blocking unit is used to stop gas in a dangerous situation. Two actions are required to open the electromagnetic valve when the dangerous situation no longer exists. First, push the manual opening unit to move the valve plate of the electromagnetic valve forward a certain distance, then the electrically controlled blocking unit moves the valve plate further according to a danger removal signal provided by a judgment device. The electromagnetic valve is not opened completely until these two movements are operated, thereby, it can prevent the blocked valve from opening intentionally during an unsafe situation.

9 Claims, 8 Drawing Sheets

UNIDIRECTIONAL RETROACTION ELECTROMAGNETIC VALVE

BACKGROUND OF THE INVENTION

1. Field of Invention

The invention relates to an electromagnetic valve, and more particularly to a unidirectional-retroaction electromagnetic valve used in a gas meter.

2. Related Art

The emergency blocking of gas is the most important function of the microcomputer gas meter. Therefore, the gas-blocking valve is a very important element in the microcomputer gas meter. The microcomputer gas meter will become obsolete without the coordination of the blocking valve.

At present, the blocking valves found in the market are mostly ever-closed and ever-open types of electromagnetic valves; these are electromagnetic valves that are only open or closed when they are not supplied with electric power. The electromagnetic valve that is at an open state when electric power is not supplied is called the ever-open electromagnetic valve; otherwise it is called the ever-closed electromagnetic valve. The power supply must be supplied continuously in order to change the state of such kinds of electromagnetic valves. Besides, the power sources usually used for general electromagnetic valves in the market are 12 DC volts or 110 AC volts and the volume of these is quite large.

The greatest characteristic of the microcomputer gas meter is that a gas flow blocking mechanism is contained therein. For example, the electromagnetic valve disclosed by U.S. Patent No. 5,408,457 is installed inside the gas meter; the invention uses a keep type electric screw bolt to push a membrane to block gas flow. Although this invention has an easy control circuit design and an excellent gas blocking effect, it has defects in the electromagnetic valve design: a balance must be achieved between the valve seat volume and flow resistance, and the stroke of the screw bolt is thus limited, If the electromagnetic valve is located in the traditional gas meter, the original mechanical structure of the gas meter must be changed greatly because of the limitation of the valve seat design.

The electromagnetic valve disclosed by Taiwan patent 424,857 has a plurality of ports, a valve seat disposed in the flow routes connected with these ports, a valve element used for opening and closing the seat, a coil wound around an iron core hole and used for moving the valve element, a magnetic frame wound around the coil, and a movable iron core fixed at one side of the iron core hole in an air-tight fashion and magnetically connected with the magnetic frame. The valve element is connected to the front end of the movable iron core and forms a gap between the iron core hole and the movable iron core. Magnetic force is applied in the gap filled with magnetic fluid. Magnetic force is imposed upon the movable iron core, which is then attracted to the fixed iron core. The advantage of this is that magnetic force is increased through the magnetic fluid. The defect of this design is that the process guarding the flow from leaking is very complex.

Another gas valve in a geyser is disclosed in Taiwan research. It benefits from its small volume and an airtight effect can be created from the attraction of the movable and fixed yokes. The defect of this is that the stroke of the valve is too small.

Also, a dual-opening electromagnetic valve structure has been developed in Taiwan patent number 271,857. It is basically the same as a general electromagnetic valve. It provides an improvement of the structure thereof, and its benefit is that it can open and close continuously. Its defect is that repeated opening and closing can cause the electromagnetic valve to become too hot to function properly. Also, its volume is quite large.

Finally, a manual retroaction electromagnetic valve developed by a Japanese gas company provides a push rod to retroact the valve cover of an electric screw bolt back to switch position, enabling the permanent magnet with strong magnetism to attract the movable axle and complete the retroaction.

The electromagnetic valves in the prior art are mostly large in volume. In addition, the designs of the electromagnetic valves require that they be provided with general city electricity, and no electromagnetic valves take batteries as their power sources.

SUMMARY OF THE INVENTION

The main object of the invention is to provide a unidirectional retroaction electromagnetic valve, which can be installed at the gas inlet of a gas meter and needs no changes in the structure of the gas meter. Therefore, it can substantially reduce the upgrading expense of the gas meter.

Another object of the invention is to provide a unidirectional retroaction electromagnetic valve that can be operated manually to push a blocking push rod and increase a blocking stroke so that it can reduce the flow resistance of the electromagnetic valve. This electromagnetic valve utilizes batteries to provide electricity.

The O-ring at the intersection of the valve opening is replaceable. It is small in volume and only needs lathe work to be finished. Therefore, it is simple to manufacture.

A blocking push rod is pushed manually when the valve is opened, and electricity is provided in coordination with a control circuit. This can reduce the electricity consumed by the electromagnetic valve. Other springs are arranged in pairs when the valve is opened. Only a little electricity (approximately 3 volts) is needed to activate the switch of the electromagnetic valve.

The unidirectional retroaction electromagnetic valve of the invention achieves an airtight state while opening. Also, a user is prevented from opening the electromagnetic valve forcibly without a valve opening command being given by the control circuit.

The unidirectional retroaction electromagnetic valve of the invention comprises a valve body having a first exit, second exit and communication part of the two exits. The first exit is connected to a gas meter, and the second exit is connected to a gas hose. An O-ring is installed at the communication part. A manual switch unit is used to push the blocking valve plate a first distance through the communication part. An electrically controlled blocking unit having a blocking valve plate is used to cover the O type ring after receiving the blocking signal in order to block the communication part to form an airtight seal, and to move the blocking valve plate a second distance after receiving an opening signal. The blocking valve is completely opened to let the first exit and second exit form a ventilation state when it is moved completely the second distance plus first distance totally. A coil set consists of a coil and magnetic cover.

The electric blocking unit having the blocking valve plate therein further comprises an electric screw bolt used to push and pull the blocking valve plate, a permanent magnet buried inside the electric screw bolt, a coil set outside of the electric screw bolt used to generate magnetic force to push or pull the permanent magnet to move the electric screw bolt, a first retroactive spring with both ends connected to the coil set and blocking valve plate, and a coil set fixing seat combined with the valve body that covers the coil set, which is used to fix the electrically controlled blocking unit.

The manual switch unit comprises a spinning cover used to fix the manual switch unit on the valve body, a retroactive push rod passed through the spinning cover and used to push the blocking valve forward the first distance, a second valve plate clipped on the retroactive push rod, a second O-ring installed on the spinning cover to form an airtight seal while connecting with the second valve plate, and a second retroactive spring with both ends connected to the second valve plate and communication ring.

The invention further discloses a method for opening the electromagnetic valve. It is a method for opening the electromagnetic valve after the gas source of the gas meter is blocked through a valve plate of the electromagnetic valve mentioned above. A judgment device determines whether there is a dangerous situation and processes blocking after transmitting a dangerous situation signal. It comprises the following steps: move the valve plate to a first opening distance and provide an electrically controlled blocking unit to push the valve plate to a second opening distance to remove the blocking action when as the dangerous situation signal is removed.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

First, the electrically controlled blocking part blocks the electromagnetic valve when a control circuit outputs a danger signal, i.e. it can stop gas by creating an airtight seal. Secondly, because most energy is consumed whenever the valve is opened, a manual unblocking is used in the invention. The manual unblocking part only needs to assist the opening of an electromagnetic valve.

Consequently, the electromagnetic valve is usually at an open state. Once a dangerous situation occurs, the electromagnetic valve receives a dangerous state assignment and processes blocking. If we want to reopen the electromagnetic valve of the invention, we must use both manual and electromagnetic actions to process unblocking. That is to say, the action of electro-magnetically activated opening is not executed before a dangerous state command is received, and the electromagnetic valve cannot be opened manually.

Figure 1:
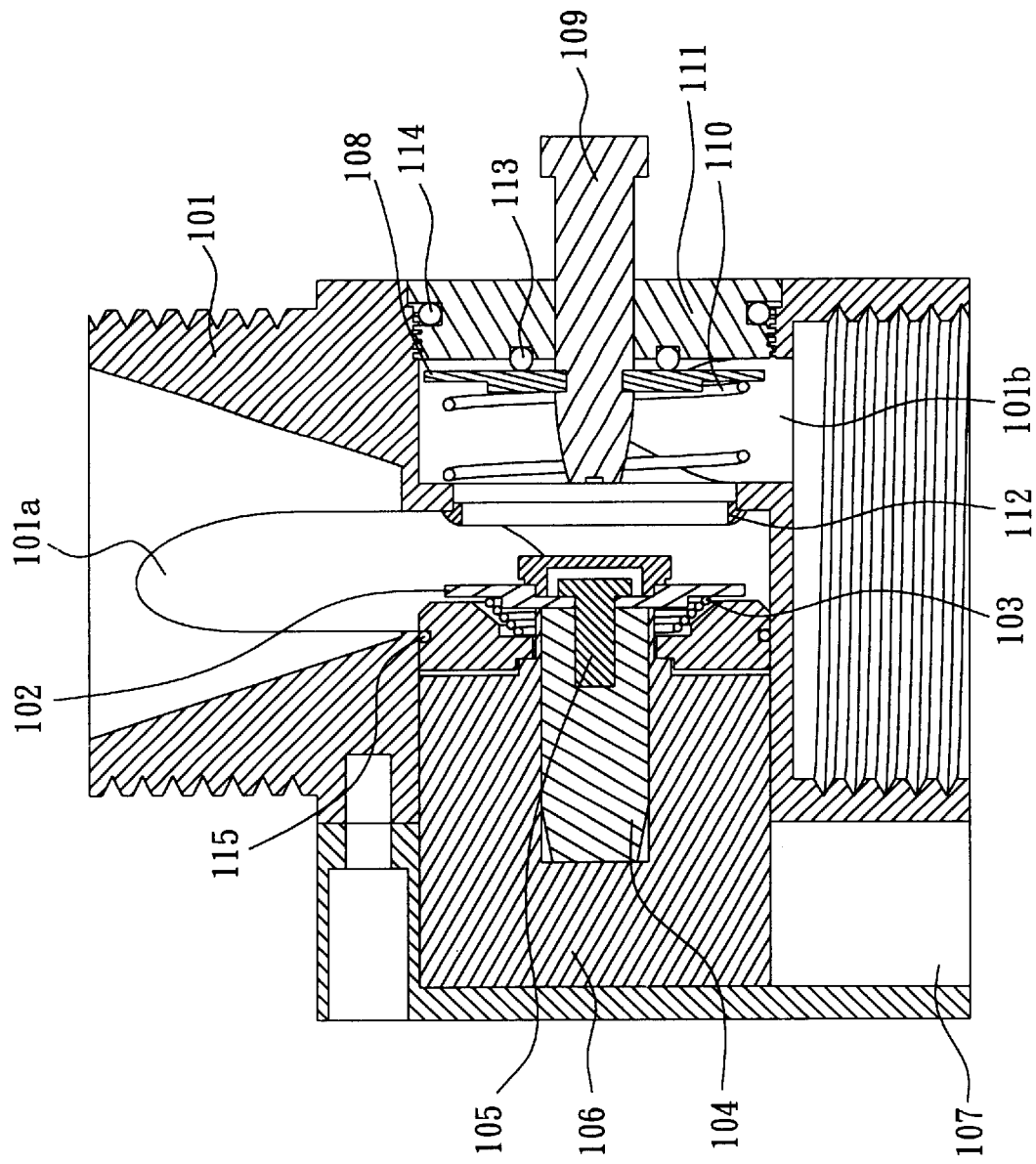
FIG. 1 is a cross sectional view of a unidirectional retroaction electromagnetic valve according to the invention.
Figure 2:
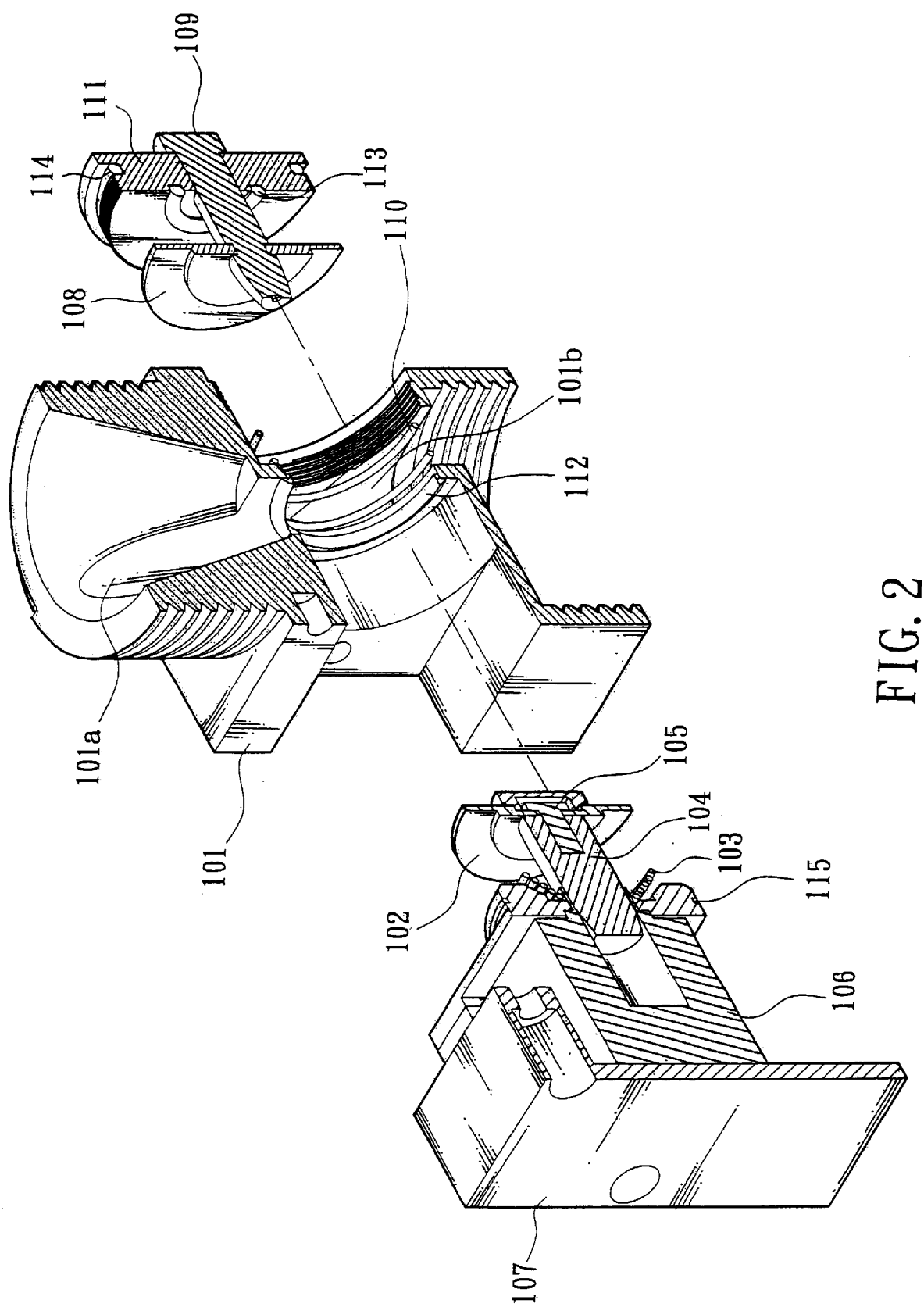
FIG. 2 is an explosive view of a unidirectional retroaction electromagnetic valve according to the invention.

Please refer to FIGS. 1 and 2. A unidirectional retroaction electromagnetic valve mainly comprises a valve body 101, first valve plate 102, first retroaction spring 103, electrical screw bolt 104, permanent magnet 105, coil set 106, coil set fixing seat 107, second valve plate 108, retroaction push rod 109, second retroaction spring 110, spinning cover, first O-ring 112, second O-ring 113, third O-ring 114, and fourth O-ring 115.

The valve body 101 is connected to the gas source of a gas meter directly. It comprises two exits, which are connected to the gas meter and a gas hose. Besides, two valve plates are installed at the other two exits of the valve body 101 respectively. The two valve plates can control the air communication state between the valve body 101 and gas meter or gas hose.

The two valve plates mentioned above are controlled via manual opening and electrically controlled blocking; they will be illustrated as follows.

The electrically controlled blocking part comprises several elements, they are the first valve plate 102, first retroactive spring 103, electrical screw bolt 104, permanent magnet 105, coil set 106 and coil set fixing seat 107. The coil set consists of coils and a permeable cover for the coils. As FIG. 1 shows, the magnetic force yielded by the coil set 106 is used to move the permanent magnet 105 buried inside of the electrical screw bolt 104, and consequently to push the electric screw forward, and then to push the first valve plate 102 disposed at the tail end of the electrical screw bolt 104. An airtight seal can be formed only if the first valve plate 102 connects with the first O-ring 112 to cause the air-flow at the first exit 101a and second exit 101b to be stopped so that blocking can be achieved. Besides, both ends of the first retroactive spring 103 are connected to the coil set 106 and the first valve plate 102. Normally, the retroactive spring 103 shrinks. The first retroactive spring 103 is extended when the push force of the coil set 106 pushes the electric screw bolt 104, and the extension force balances with the push force of the coil set 106. Therefore, the distance that the first valve plate is moved while blocking relates to both the coil number of the coil set 106 and the force balance state of the first retroactive spring 103.

Besides, the coil set 106 must be fixed, so a coil set fixing seat 107 is installed. The coil set fixing seat 107 can be connected to the valve body 101 to fix the whole coil set 106. A fourth O-ring 115 is disposed between the coil set 106 and the valve body 101 in order to allow the space between the coil set 106 and valve body 101 to be airtight.

The manual part is designed to save electricity while the valve is opened. The manual opening part consists of a second valve plate 108, retroactive push rod 109, second retroactive spring 110 and spinning cover 111, as shown in FIGS. 1 and 2. The spinning cover 111 fixes the manual opening part on the valve body. A third O-ring 114 may also be installed on the spinning cover 111 to allow the contacting face of the spinning cover 111 and valve body 101 to be airtight.

The push end of the retroactive push rod 109 can be seen outside of the valve body 101. This also means that the tail end is a manual push part. The head end can touch the first valve plate 102 that is pushed to the edge of the first O-ring 112. The second retroactive spring 110 is disposed at both ends of the first O-ring and second valve plate 108, and it can push the second valve plate 108 back to its original position once a user's hand is released after pushing the retroactive push rod forward.

Figure 3:
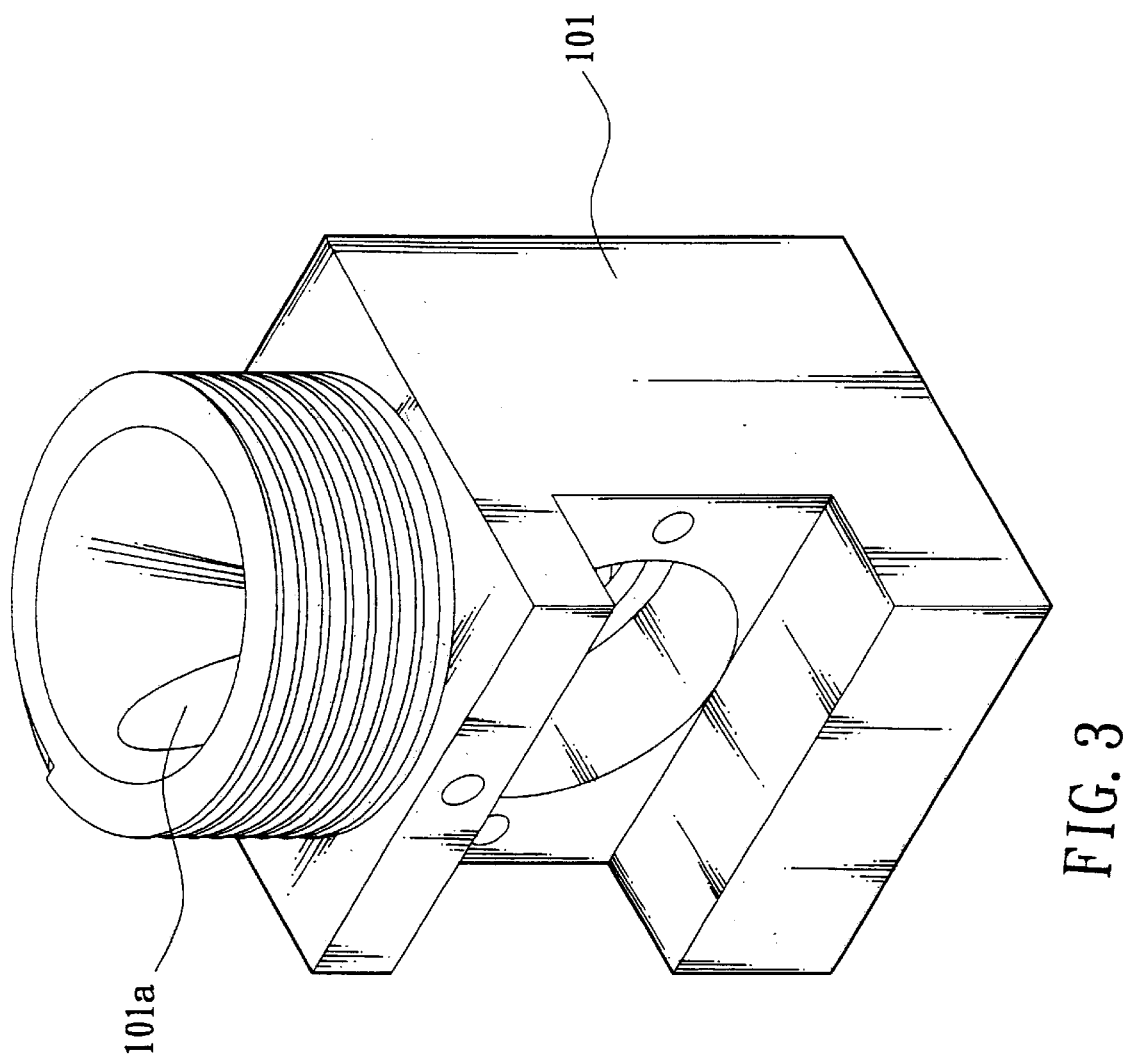
FIG. 3 is a perspective view of a valve body of a unidirectional retroaction electromagnetic valve according to the invention.
Figure 4:
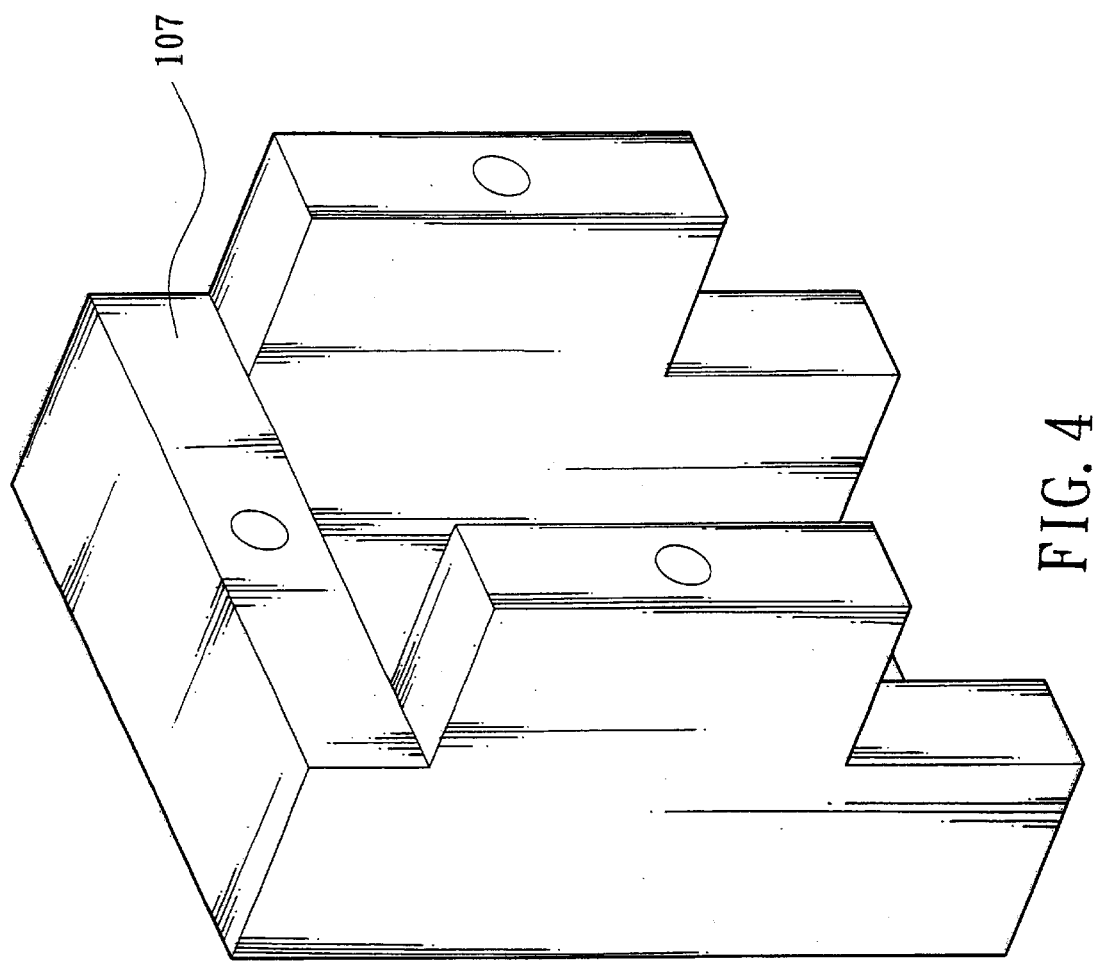
FIG. 4 is a perspective view of a coil-fixing seat of a unidirectional retroaction electromagnetic valve according to the invention.

The manual opening part must be designed to be airtight because the value is normally ventilated, So, a second O-ring 113 is disposed at the contact point of the second valve plate 108 and the spinning cover 111 to form an airtight seal, Next, refer to FIGS. 3 and 4. As the figures show, the valve body 101 is connected to the coil set fixing seat 107 through screw holes. Two projecting parts of the fixing seat 107 can be combined to hollow parts of the valve body 101. The coil set 106 is sandwiched between the valve body 101 and the coil set fixing seat 107.

Figure 5A:
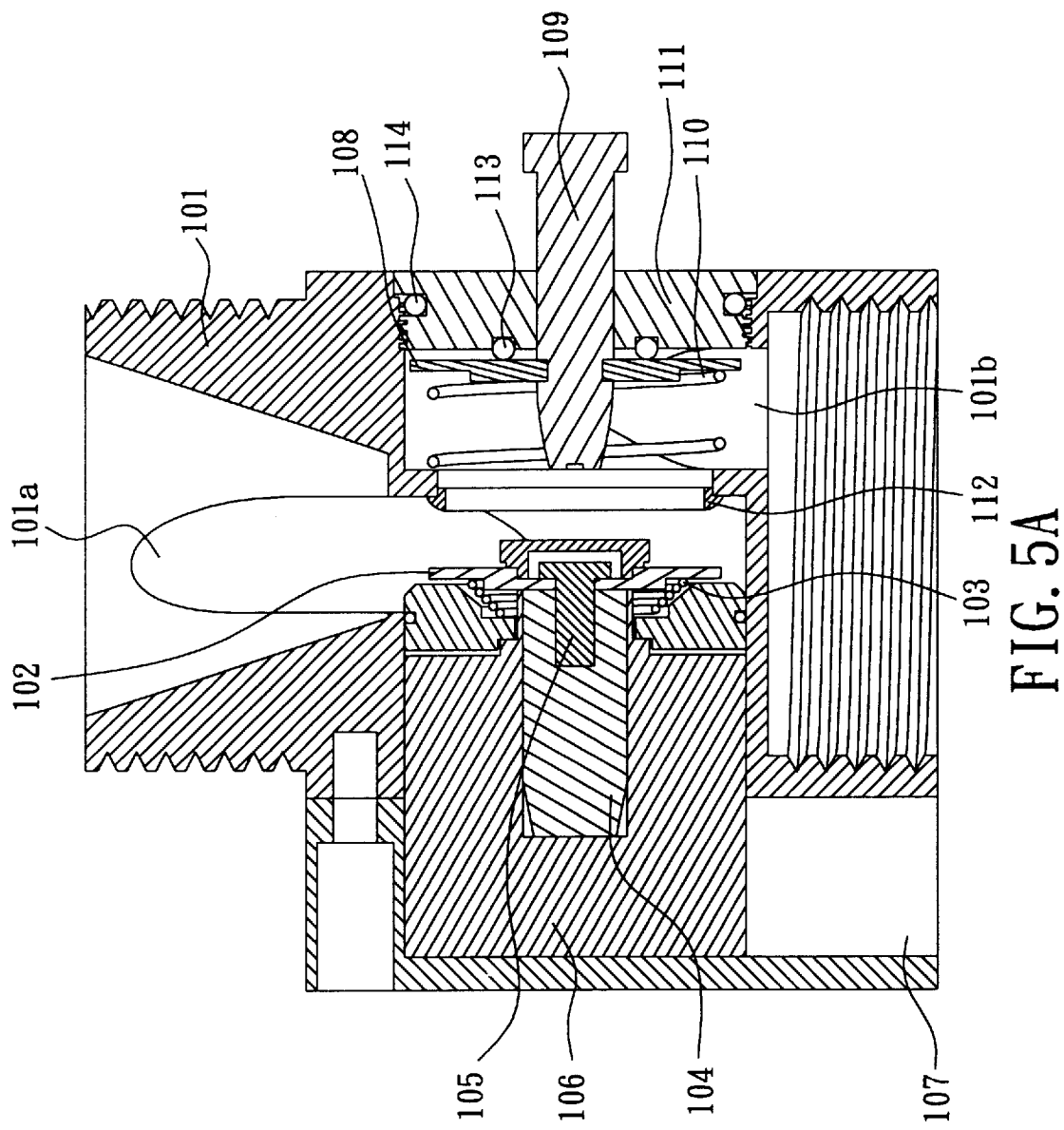
FIG. 5A is a cross sectional view of a unidirectional retroaction electromagnetic valve at normal operation according to the invention.

Please refer to FIGS. 5A to 5D. FIG. 5A shows a valve in normal operation; the first valve plate 102 and second valve plate 108 are opened completely.

Figure 5B:
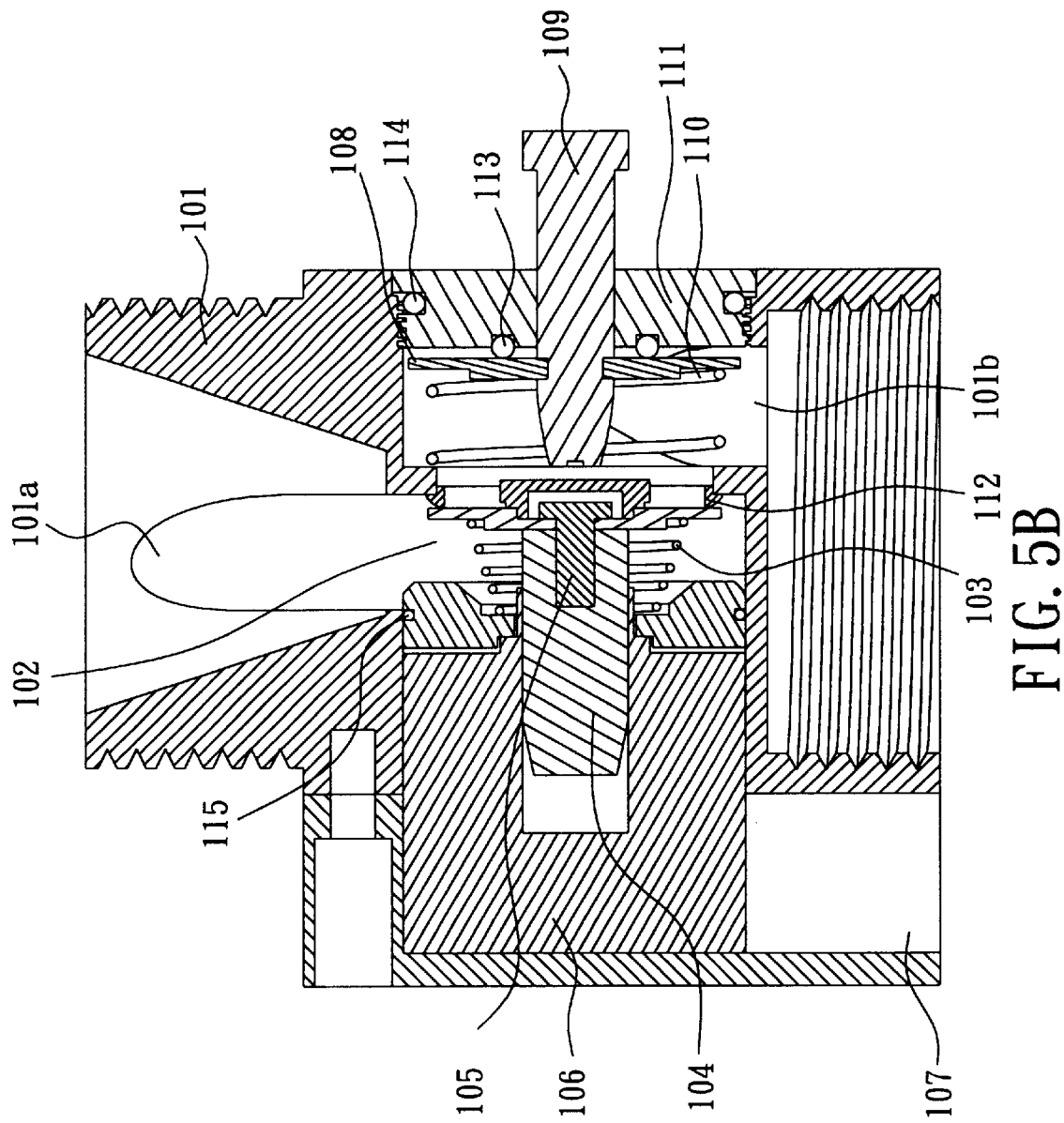
FIG. 5B is a cross sectional view of a unidirectional retroaction electromagnetic valve while being closed according to the invention.

Next, as FIG. 5B shows, an emergency message is transmitted to an electromagnetic valve after the control circuit determines that an emergency has occurred. The coil set 106 of the electromagnetic valve soon generates a polarity opposite to the permanent magnet 105. Therefore, the electrical screw bolt 104 is driven to move through the permanent magnet 105 to push the first valve plate 102 to the end to process blocking.

Figure 5C:
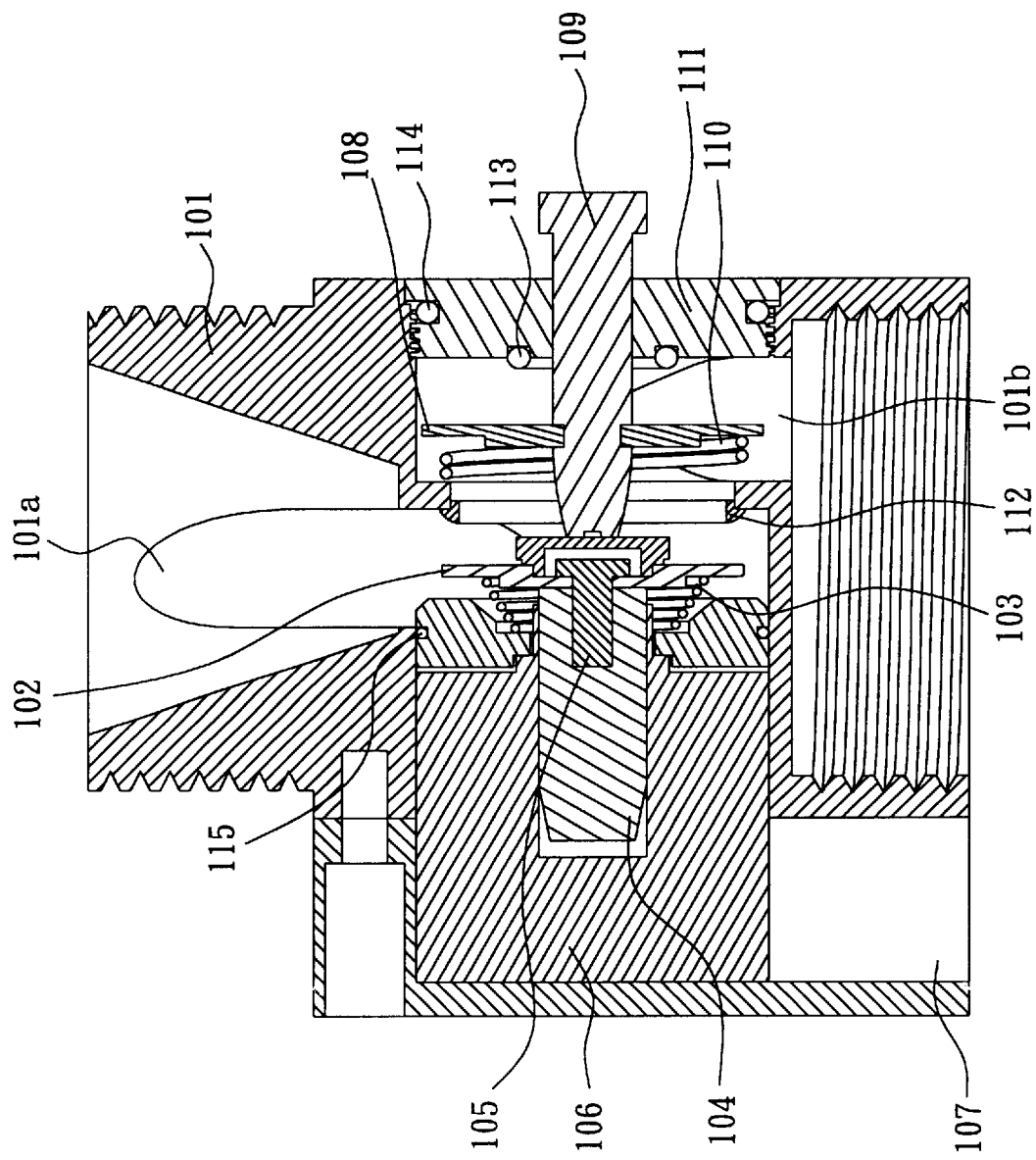
FIG. 5C is a cross sectional view of a unidirectional retroaction electromagnetic valve when a retroactive push rod is pushed according to the invention.

Pushing down the retroactive push rod 109 manually does not open the electromagnetic valve. However, blocking cannot be achieved even if the retroactive push rod 109 is pressed down because the control circuit does not output a blocking removal signal if the control circuit determines that the emergency situation has not ended, as shown in FIG. 5C. The theory is very simple; the coil set 106 continues generating repulsive magnetic force with the permanent magnet 105 when an emergency takes place. Therefore, even if the retroactive push rod 109 is moved, the repulsive force yielded by the coil set 106 can push the first valve plate 102 to the first O-ring 112 to process blocking after the retroactive push rod 109 is released.

Figure 5D:
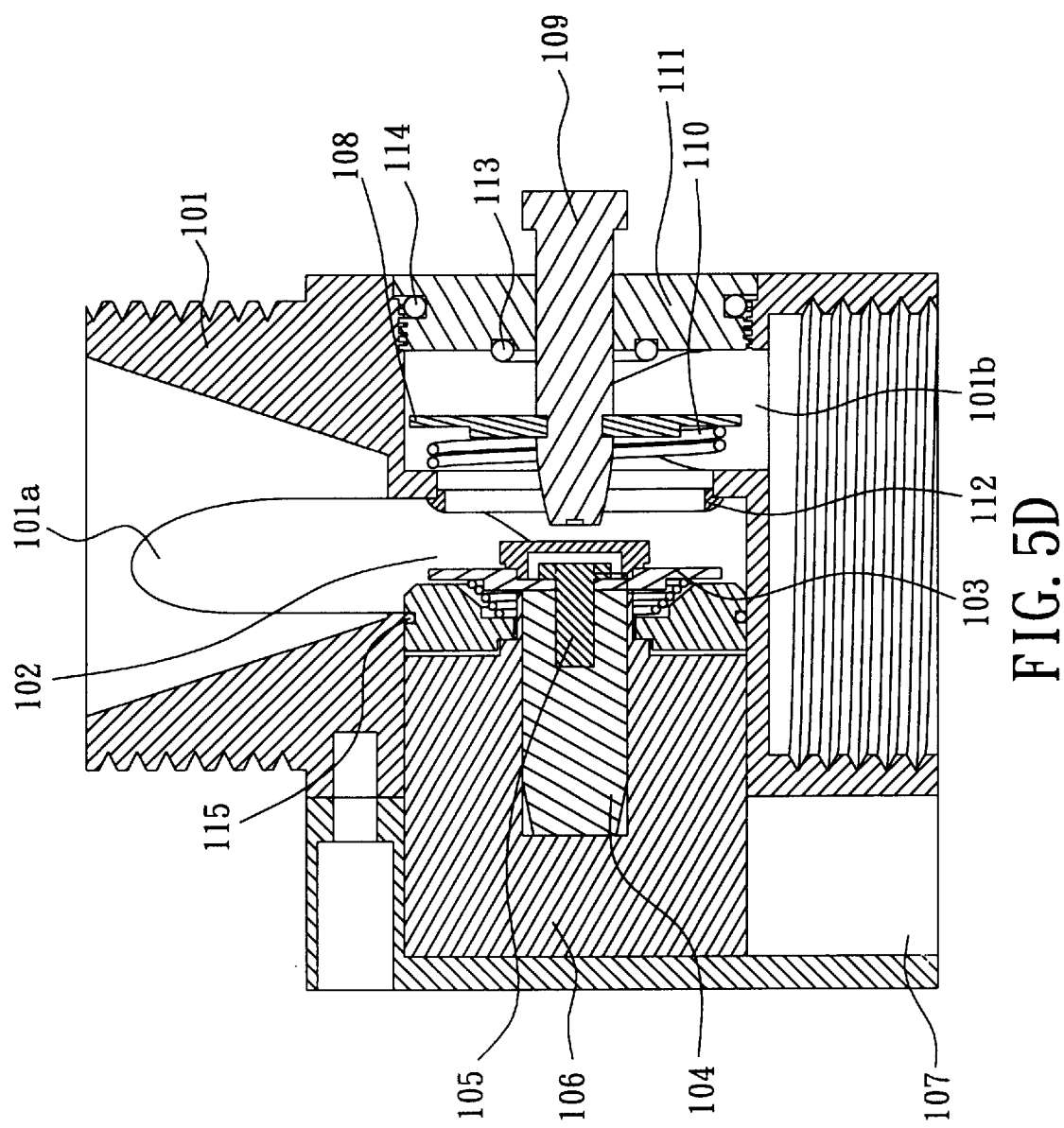
FIG. 5D is a cross sectional view of a unidirectional retroaction electromagnetic valve when electromagnetic attraction is in operation according to the invention.

Therefore, the valve opening process according to the invention can be clearly seen from FIGS. 5C and 5D. Completing the valve opening action must have two indispensable conditions. The first condition is that the coil set 106 no longer generates a repulsive force to push the first valve plate forward to the first O-ring 112 after the emergency situation ends, but generates an attractive electromagnetic force to let the permanent magnet 105 attract the coil set 106. Here, the attractive distance is designated to be a first distance d1. The second indispensable condition is that the manual retroactive action can push the first valve plate toward the coil set 106; the pushing distance can be designated to be a second distance d2. The distance pushed by these two forces is d1+d2; it is exactly the distance for pushing the first valve plate 102 back to the normal position, as can be seen in FIG. 5D.

The unidirectional retroaction electromagnetic valve according to the invention can be operated for ten years under the power supply of a battery (3 V), owing to the use of its assistant manual valve opening.

The unidirectional retroaction electromagnetic valve according to the invention can be installed at a gas supply end to block gas directly in order to attain the effect of immediate blocking, owing to the power supply of a battery.

The unidirectional retroaction electromagnetic valve according to the invention can achieve an airtight seal owing to the installment of a spinning cover.

Besides, the unidirectional retroaction electromagnetic valve according to the invention can prevent a valve from being opened forcibly by manual action when a dangerous situation still exists because a judgment logic is added.

It is noted that the invention is described above for the purpose of illustration only, and this description is not intended as a definition of the limits and scope of the invention disclosed. Any modifications and variations that may be apparent to a person skilled in the art are intended to be included within the scope of the following claims.

What is claimed is:

1. A unidirectional retroaction electromagnetic valve connected to a gas meter at a gas inlet, and received a blocking signal and opening signal transmitted form a control circuit for blocking and opening the connection of the gas flow, which uses a battery to supply electric power thereof, comprising:

a valve body having a first exit, second exit and a communication part communicated with said two exits, which said first exit being is connected to said gas meter and said second exit is connected to a gas hose;

an O-ring installed at said communication part;

a manual opening unit used to push a blocking valve plate a first distance through said communication part; and an electrically controlled blocking unit having a blocking valve plate used to cover said O-ring after receiving said blocking signal in order to block said communication part to form an airtight seal, which pushes said blocking valve plate a second distance after receiving said opening signal; when said blocking valve plate being moved said first distance and second distance at the same, said first exit and second exit is completely ventilated.

2. The valve of claim 1, wherein said electrically controlled blocking unit with said blocking valve plate further includes:

a electric screw bolt used to push and pull said blocking valve plate;

a permanent magnet buried inside of said electric screw bolt;

a coil set covered outside of said electric screw bolt, for generating magnetic force to push forward or pull back said permanent magnet to drive said electric screw bolt;

a first retroactive spring having two ends connected to said coil set and said blocking valve plate; and a coil set fixing seat combined with said valve body and covered said coil set, which is used to fix said electrically controlled blocking unit.

3. The valve of claim 2, wherein said coil set is consisted of a coil and magnetic covering.

4. The valve of claim 1, wherein said manual opening unit includes:

a spinning cover, for fixing said manual opening unit on said valve body;

a retroactive push rod passed through said spinning cover, for pushing said blocking valve plate to move forward said first distance;

a second valve plate clipped on said retroactive push rod;

a second O-ring installed on said spinning cover, which forms an second airtight seal while connecting with said second valve plate; and a second retroactive spring having two ends connected to said second valve plate and said communication ring.

5. The valve of claim 1, further comprising a third O-ring, installed at a contacting point of said spinning cover and said valve body to form an third airtight seal.

6. The valve of claim 1, further comprising a fourth O-ring installed at a contacting point of said coil set and said valve body to form a fourth airtight seal.

7. The valve of claim 1, wherein said first distance plus said second distance equals to a distance between a position where said blocking valve plate is blocking and a position where said blocking valve is opening.

8. A unidirectional valve opening method for opening an electromagnetic valve connected to a gas source of a gas meter after said gas source is blocked through a valve plate, wherein said blocking action processes blocking after a dangerous situation judgment device judges dangerous situation and transmits a dangerous situation signal, said method comprising the steps of:

moving said valve plate manually to a first opening distance; and providing an electrically controlled blocking unit, for pushing said valve plate to move to a second opening distance to remove said blocking action in coordination with said manual manner when said dangerous situation signal is removed.

9. The method of claim 8, wherein said first distance plus said second distance equals to a distance between a position where said blocking valve plate is blocking and a position where said blocking valve is opening.

* * * * *